(12) United States Patent
Lee

(10) Patent No.: US 7,437,737 B2
(45) Date of Patent: Oct. 14, 2008

(54) METHOD FOR COMMONLY CONTROLLING DEVICE DRIVERS

(75) Inventor: Hyong-Kyun Lee, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 705 days.

(21) Appl. No.: 10/607,167

(22) Filed: Jun. 27, 2003

(65) Prior Publication Data
US 2004/0030415 A1   Feb. 12, 2004

(30) Foreign Application Priority Data
Aug. 8, 2002   (KR) .................. 10-2002-0046757

(51) Int. Cl.
*G06F 3/00* (2006.01)
(52) U.S. Cl. ........................ 719/321; 710/10
(58) Field of Classification Search ............... 710/3–10; 719/321–328
See application file for complete search history.

(56) References Cited

U.S. PATENT DOCUMENTS

| 5,802,365 | A  * | 9/1998  | Kathail et al. ............ 719/321 |
| 6,223,134 | B1 * | 4/2001  | Rust et al. ................ 702/121 |
| 6,282,586 | B1   | 8/2001  | Bullough |
| 6,311,228 | B1 * | 10/2001 | Ray ............................ 719/321 |
| 6,505,258 | B1 * | 1/2003  | Sakarda et al. ........... 710/18 |
| 6,993,772 | B2 * | 1/2006  | Pike et al. ................ 719/321 |
| 2002/0059474 | A1 * | 5/2002 | Camara et al. ........... 709/321 |
| 2002/0170039 | A1 * | 11/2002 | Kovacevic .............. 717/138 |
| 2003/0037180 | A1 * | 2/2003 | Madineni et al. ........ 709/321 |

FOREIGN PATENT DOCUMENTS

| JP | 2-195462 | 8/1990 |
| JP | 8-272717 | 10/1996 |
| JP | 10-011384 | 1/1998 |

OTHER PUBLICATIONS

Japanese Office Action of the Japanese Patent Application No. 2003-289785, mailed on Mar. 7, 2006.
Chinese Office Action; Application No. 03127712.8; issue date Jan. 14, 2005.
Japanese Office Action corresponding to Japanese Patent Application No. 2003-289785, issued on Dec. 5, 2006.

* cited by examiner

*Primary Examiner*—Meng-Ai An
*Assistant Examiner*—Charles E Anya
(74) *Attorney, Agent, or Firm*—Robert E. Bushnell, Esq.

(57) ABSTRACT

A technique for commonly controlling device drivers includes the arranging of a DIA (Device Independent Access) hierarchy between an application hierarchy and a device driver hierarchy and applying a standardized rule of the DIA hierarchy to the application hierarchy and the device driver hierarchy, and allowing the application hierarchy and the device driver hierarchy to access the device driver hierarchy and the application hierarchy through the standardized rule of the DIA hierarchy, respectively.

8 Claims, 14 Drawing Sheets

METHOD FOR COMMONLY CONTROLLING DEVICE DRIVERS

CLAIM OF PRIORITY

This application makes reference to, incorporates the same herein, and claims all benefits accruing under 35 U.S.C. §119 from an application for COMMON CONTROL IMPLEMENT METHOD FOR DEVICE DRIVER earlier filed in the Korean Industrial Property Office on Aug. 8, 2002 and there duly assigned Ser. No. 2002-46757.

BACKGROUND OF THE INVENTION

1. Field of the Invention

The present invention relates to a communication system, and more particularly to a method for commonly controlling device drivers of a hardware chip level.

2. Description of the Related Art

Currently, manufacturers of higher-order applications and lower-order device drivers develop their products independently of one another. Presently, different vendors provide a large number of device drivers. This means that the lack of communication between the manufacturers of the higher-order applications and the lower-order device drivers can become serious. Conventionally, APIs (Application Program Interfaces) are made on the basis of individual unique respective standards of the higher-order applications and the lower-order device drivers. Accordingly, the higher-order applications and the lower-order device drivers can be made to conform to the standards of each other.

Where the device driver cannot meet the requirements of the higher-order applications, there is a problem in that a code or structure affecting the higher-order applications should be corrected. At this time, the higher-order applications and the device driver should be re-verified.

If a specific portion is changed where a first device is changed to a second device in relation to a common application or two applications use a common device driver, the higher-order applications and the device drivers should be re-verified. The re-verification requirement can adversely affect the development of products and reduce competitiveness of the product because of the increased time needed for the product development.

SUMMARY OF THE INVENTION

Therefore, the present invention has been made in view of the above and other problems, and it is an object of the present invention to provide a method capable of independently and commonly employing a higher-order application hierarchy and a lower-order device driver by arranging a DIA (Device Independent Access) hierarchy as an intermediate hierarchy between the higher-order application hierarchy and the lower-order device driver for the sake of establishing a mutual interface in a communication system.

It is another object of the present invention to provide a method capable of independently and commonly employing a lower-order device driver hierarchy in a communication system.

It is yet another object of the present invention to provide a method capable of independently and commonly employing a higher-order application hierarchy in a communication system.

In accordance with an aspect of the present invention, the above and other objects can be accomplished by the provision of a method for commonly controlling device drivers, including: arranging a DIA (Device Independent Access) hierarchy between an application hierarchy and a device driver hierarchy and applying a standardized rule of the DIA hierarchy to the application hierarchy and the device driver hierarchy; and allowing the application hierarchy and the device driver hierarchy to access the device driver hierarchy and the application hierarchy through the standardized rule of the DIA hierarchy, respectively.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
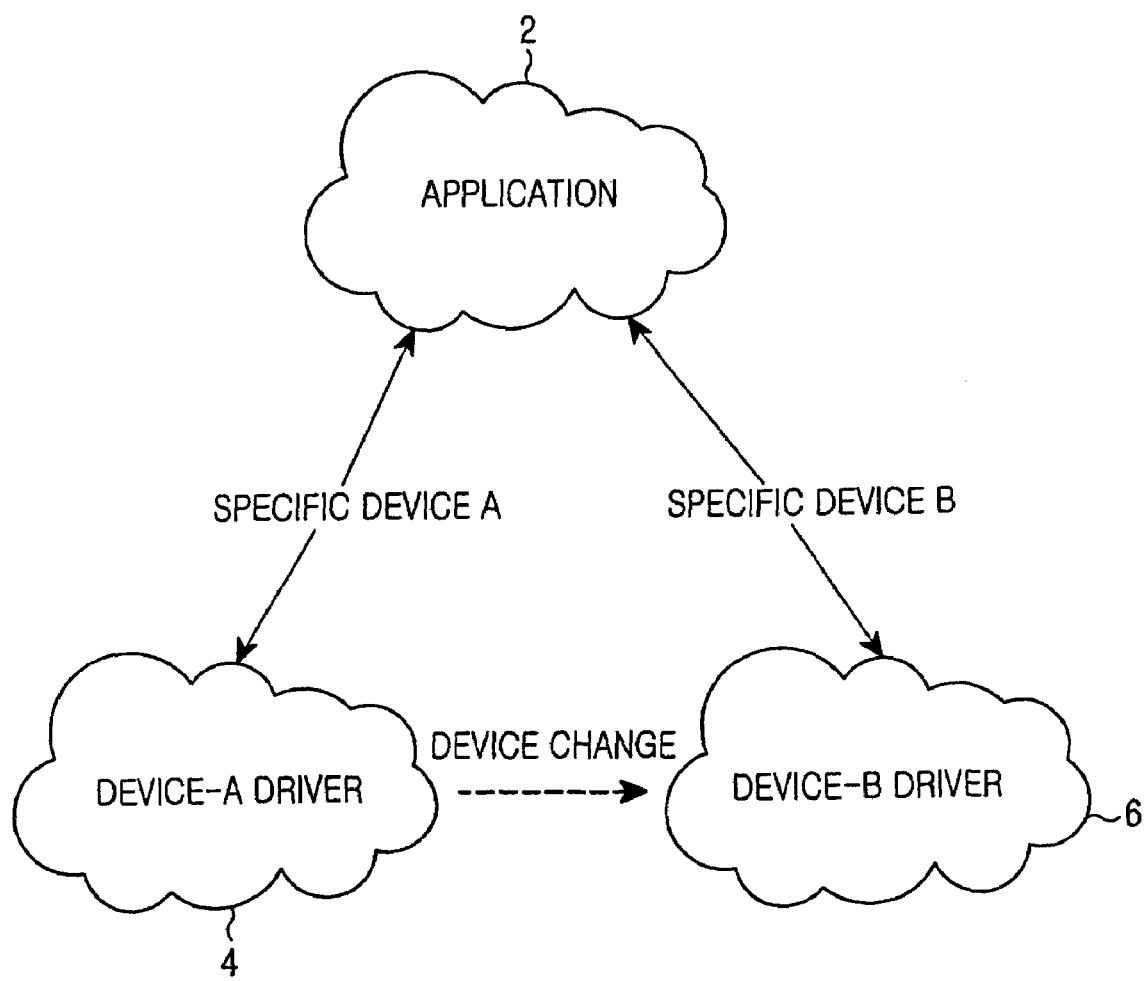
FIG. 1 is a view illustrating a case where a device A is changed to a device B in relation to a common application.
Figure 2:
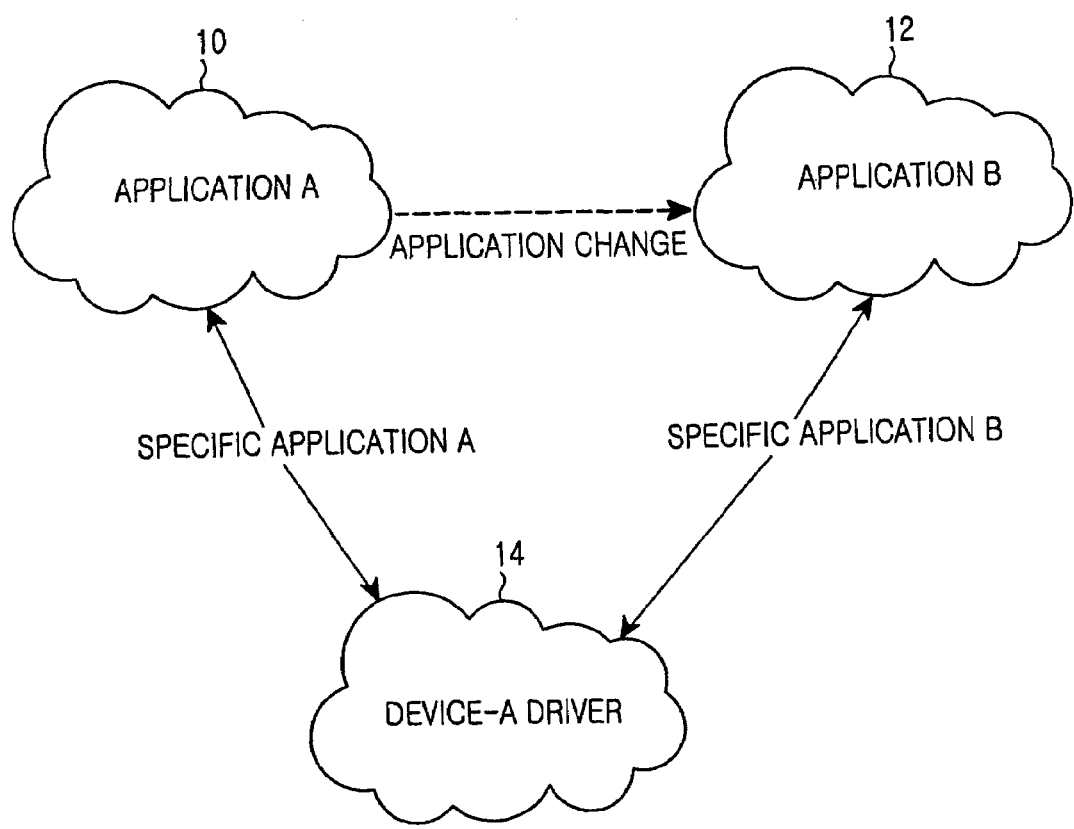
FIG. 2 is a view illustrating a case where two applications use a common device driver.

Turning now to the drawings, FIG. 1 illustrates a case where a device A is changed to a device B in relation to a common application. FIG. 2 illustrates a case where two applications use a common device driver.

Referring to FIG. 1, when the device A is changed to the device B in relation to a common application 2 as a higher-order application 2, a device-A driver 4 is also changed to a device-B driver 6, wherein the device-A and device-B drivers 4 and 6 are lower-order device drivers. If so, APIs have different characteristics associated with the devices A and B. Accordingly, the higher-order application 2 should be also changed according to the changed device and device driver.

When the device driver is changed, all APIs associated with the changed lower-order device driver should be newly verified. In other words, it should be verified whether the APIs appropriately operate on the basis of the changed device driver. Further, it should be checked whether all higher-order applications associated with the changed lower-order device driver affect others.

Next, referring to FIG. 2, a higher-order application-A 10 and a higher-order application-B 12 use a common device driver 14. The higher-order applications-A and B 10 and 12 need different formats from the device driver 14. For example, the higher-order application-A 10 needs two formats A-1 and A-2 provided from the device driver 14. Otherwise, the higher-order application-B 12 needs three formats B-1, B-2 and B-3 provided from the device driver 14. This case occurs because a format agreement between the applications has not been agreed upon. Accordingly, the device driver 14 should change formats in response to different requirements from the higher-order applications-A and B 10 and 12 and therefore the APIs should be changed and added. Where the device driver cannot meet the requirements of the higher-order applications, there is a problem in that a code or structure affecting the higher-order applications should be corrected. At this time, the higher-order applications and the device driver should be re-verified.

As described in connection with FIGS. 1 and 2, if a specific portion is changed where the device A is changed to the device B in relation to the common application or the two applications use the common device driver, the higher-order applications and the device drivers should be re-verified. The re-verification requirement can adversely affect the development of products and reduce competitiveness of the product because of the increased time needed for the product development.

The present invention prevents a higher-order application hierarchy and a lower-order device driver hierarchy from directly accessing each other by arranging a DIA (Device Independent Access) hierarchy between the higher-order application hierarchy and the lower-order device driver hierarchy in a communication system. Accordingly, the higher-order application hierarchy and the lower-order device driver hierarchy can access the lower-order device driver hierarchy and the higher-order application hierarchy via the DIA on the basis of the DIA's standardized rule, respectively. Because the higher-order application hierarchy and the lower-order device driver hierarchy accesses the lower-order device driver hierarchy and the higher-order application hierarchy on the basis of the DIA's standardized rule, respectively, a period of time required for the development of products, and costs of product development can be reduced, and efficiency of product development can be improved.

Now, preferred embodiments of the present invention will be described in detail with reference to the annexed drawings. In the following description, a detailed description of known functions and configurations incorporated herein will be omitted when it may make the subject matter of the present invention rather unclear.

Figure 3:
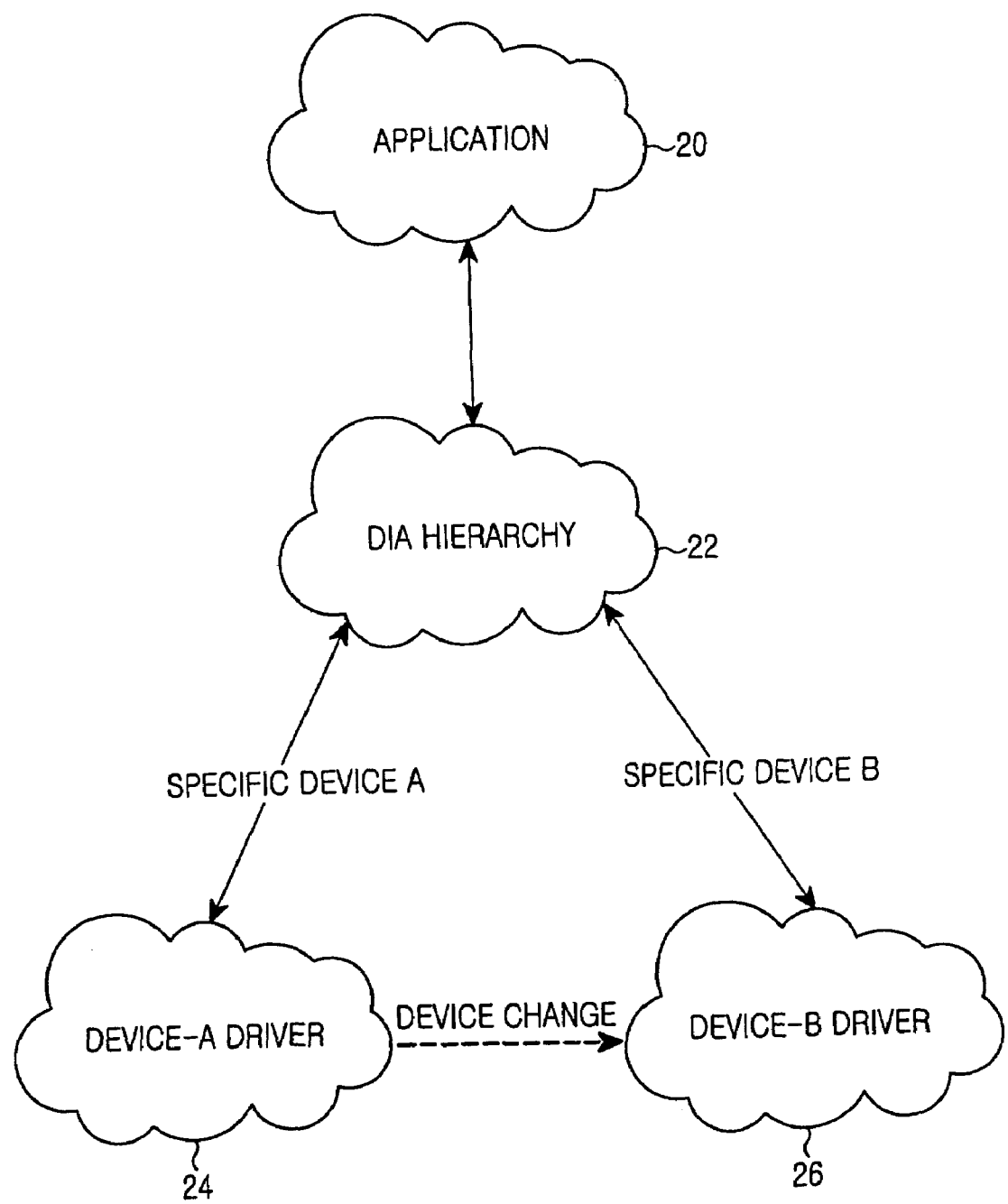
FIG. 3 is a view illustrating a concept of commonly controlling device drivers in accordance with an embodiment of the present invention.

FIG. 3 is a view illustrating a concept of commonly controlling device drivers in accordance with an embodiment of the present invention. Referring to FIG. 3, a DIA (Device Independent Access) hierarchy 22 is arranged between a higher-order application 20 and device drivers 24 and 26 in a communication system in accordance with the embodiment of the present invention. The higher-order application 20 accesses the device drivers 24 and 26 via the DIA hierarchy 22 on the basis of a standardized rule of the DIA hierarchy 22. Similarly, the device drivers 24 and 26 access the higher-order application 20 via the DIA hierarchy 22 on the basis of the standardized rule of the DIA hierarchy 22. This will be described in detail with reference to FIG. 4.

Figure 4:
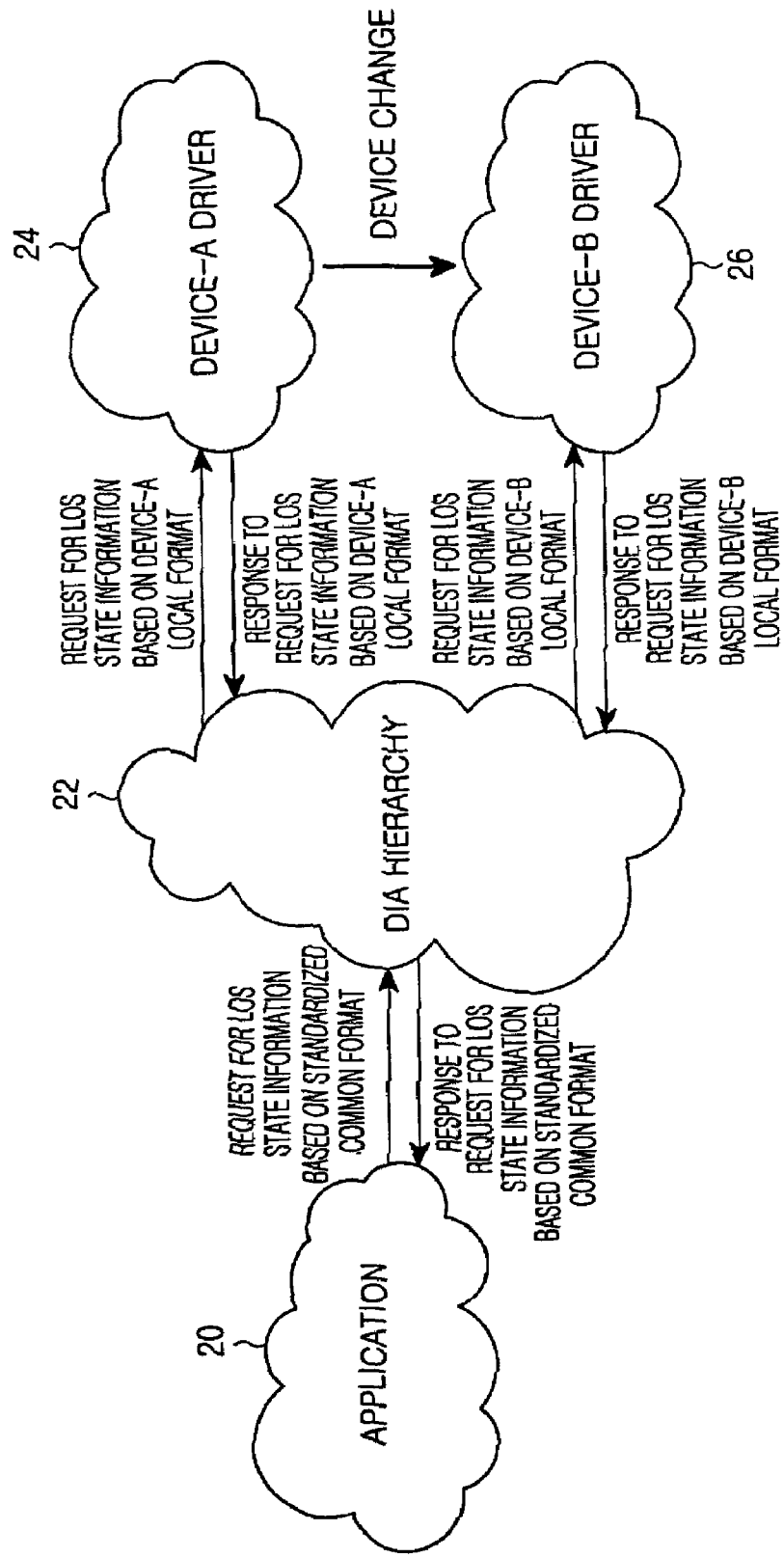
FIG. 4 is a view illustrating an access for device driver control commonization.

FIG. 4 is a view illustrating an access for device driver control commonization. Referring to FIG. 4, when the higher-order application 20 requests the DIA hierarchy 22 to provide information associated with an LOS (Loss Of Signal) state based on a standardized common format, the DIA hierarchy 22 converts the request into a device-A local format and then requests a device-A driver 24 to provide the LOS state information. Accordingly, the device-A driver 24 provides the LOS state information based on the device-A local format to the DIA hierarchy 22. The DIA hierarchy 22 converts the LOS state information based on the device-A local format into the standardized common format and then provides the LOS state information based on the standardized common format to the high-order application 20. On the other hand, if a device A is changed to a device B, a device-A driver is also changed to a device-B driver. The higher-order application 20 requests the DIA hierarchy 22 to provide the LOS state information based on the standardized common format irrespective of the changed device. Further, the DIA hierarchy 22 converts the request into a device-B local format and then requests the device-B driver 26 to provide the LOS state information. Accordingly, the device-B driver 26 provides the LOS state information based on the device-B local format to the DIA hierarchy 22. The DIA hierarchy 22 converts the LOS state information based on the device-B local format into the LOS state information based on the standardized common format and then provides the LOS state information based on the standardized common format to the higher-order application 20. As described above, the DIA hierarchy 22 arranged between the lower-order device drivers 24 and 26 provides a mutual interface based on the standardized rule. According to the change of the applications or devices, the verifications of the higher-order applications and the device drivers are not needed.

In order to provide the mutual interface based on the standardized rule between the higher-order application 20 and the lower-order device drivers 24 and 26, the DIA hierarchy 22 in accordance with the present invention reads materials from a DDCB (Device Driver Control Block) and accesses the lower-order device driver using functions defined by the standardized rule. The DDCB is defined to commonize the respective device drivers and then provides information associated with the existence of a corresponding function and the position of a corresponding function.

In the embodiment of the present invention, only functions available in a corresponding device driver among functions of a function block defined and standardized in international organizations such as ITU/RFC (International Telecommunications Union/Request For Comments), etc. is defined in a function table. The present invention employs all function blocks defined in standardized documents made by international organizations for standardization such as ITU (International Telecommunications Union), IETE (Internet Engineering Task Force), ETSI (European Telecommunications Standardization Institute), ATM (Asynchronous Transfer Mode) forum, ADSL (Asymmetrical Digital Subscriber Line) forum, etc. In the embodiment of the present invention, only functions available in the corresponding device driver among functions of all function blocks defined by the international organizations for standardization are re-defined in the function table.

In the embodiment of the present invention, the DIA hierarchy 22 uses device handler IDs (identifiers) based on a standardized data format so that developers of higher-order applications easily control the devices. The device handler ID has the standardized data format according to the embodiment of the present invention and are unique identifiers corresponding to the respective devices. The DIA hierarchy 22 provides the device handler IDs to the higher-order application 20 during the initialization of the corresponding device. The higher-order application 20 stores the device handler IDs and calls a corresponding device using a corresponding device handler ID where it is necessary to call the corresponding device. Accordingly, the DIA hierarchy 22 decides on the basis of the device handler ID whether some device driver should be called, and then calls a device driver according to the decision.

Hereinafter, a detailed description will be given of the device handler IDs being the unique identifiers and a command control table generated and provided to the higher-order application 20 by the DIA hierarchy 22 with reference to FIGS. 5 to 8. Further, a corresponding event table and a profile of a corresponding device module mentioned in the embodiment of the present invention will be described in detail with reference to FIGS. 5 to 8.

Figure 5:
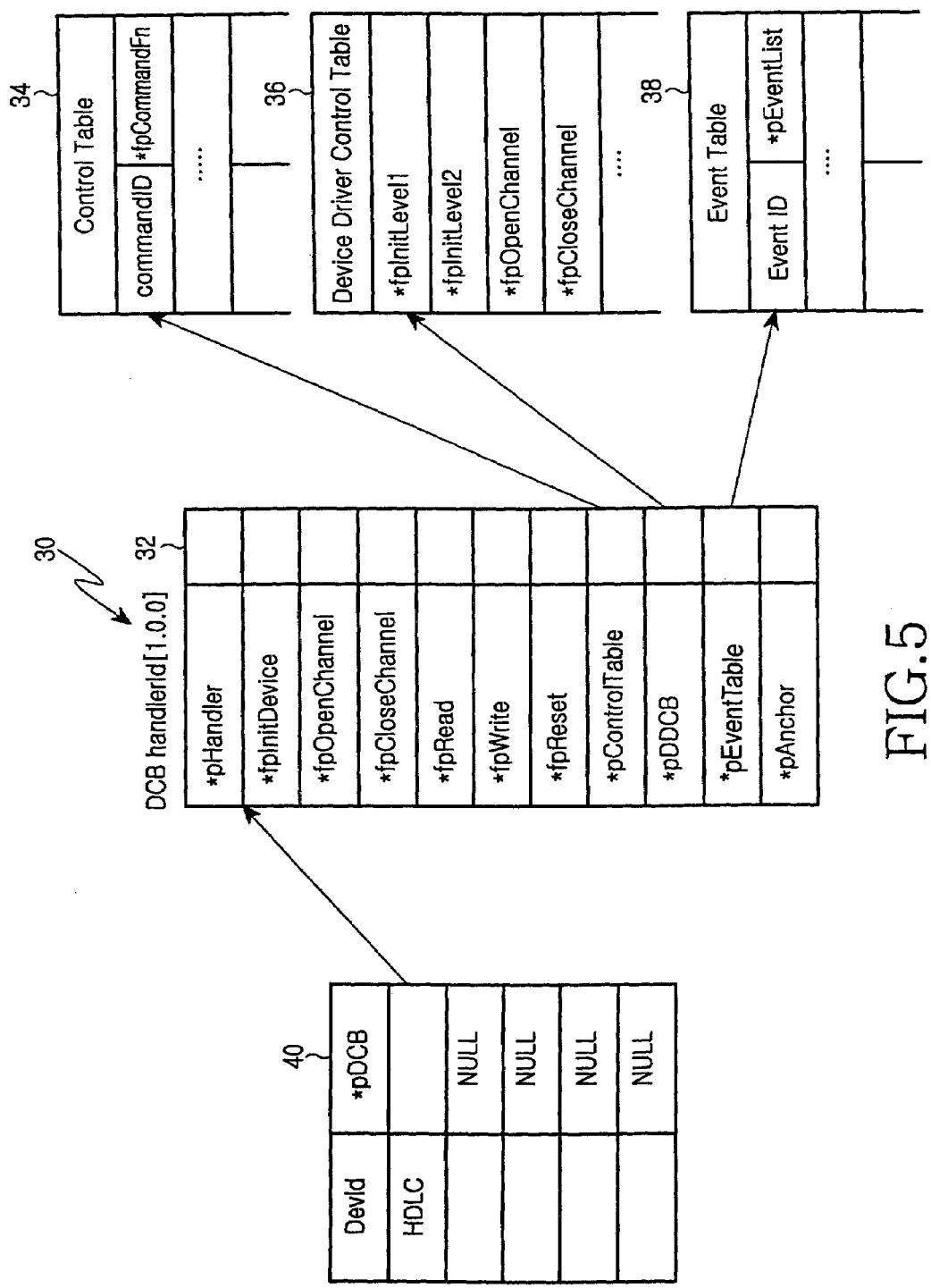
FIG. 5 is a view illustrating a connection structure of a DCB (Device Control Block) after an API (Application Program Interface) "Dia_InitDevice" is called for device initialization.
Figure 6:
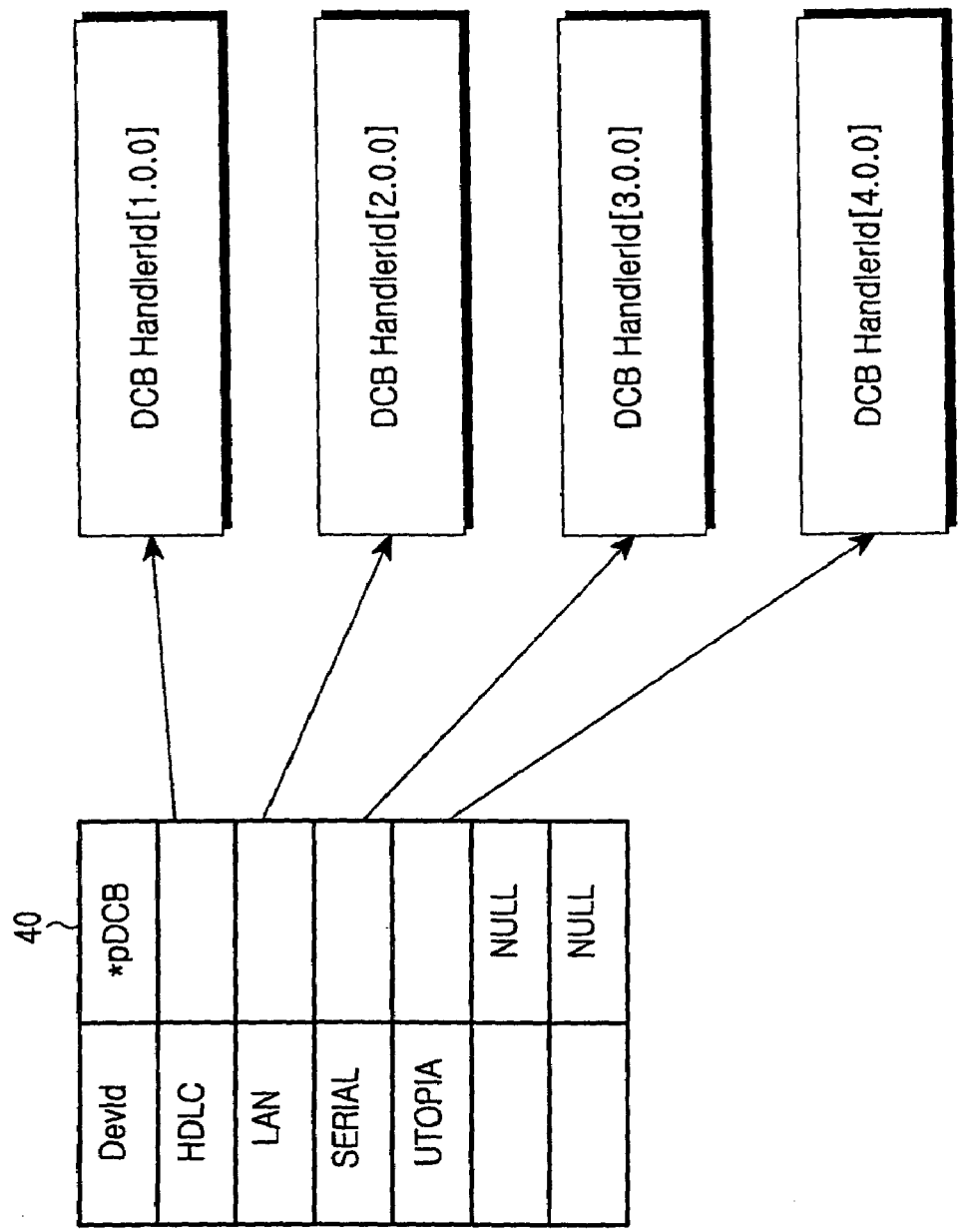
FIG. 6 is a view illustrating a final DCB in a level 1 initialization stage.
Figure 7:
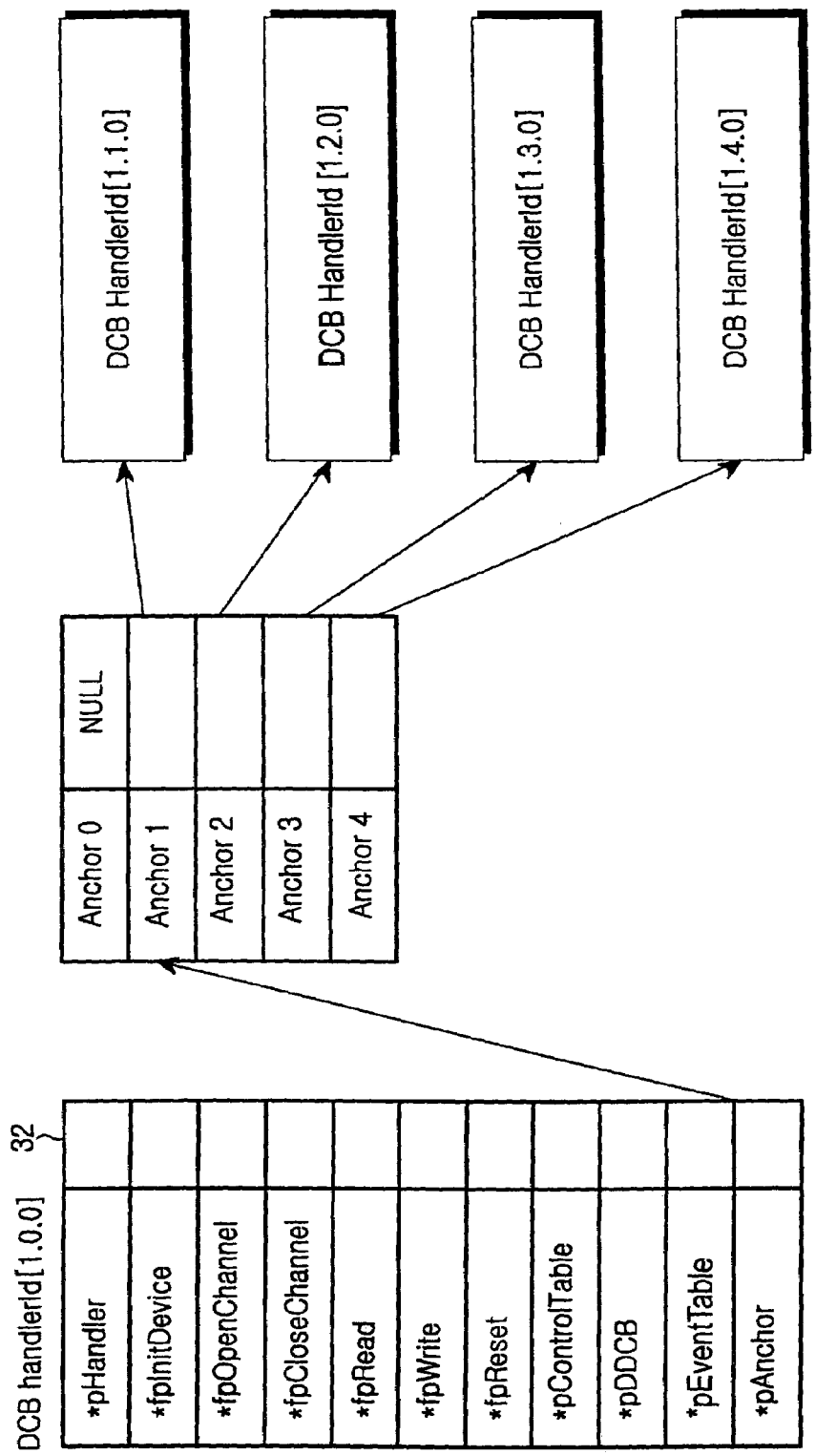
FIG. 7 is a view illustrating a connection structure of a DCB when an HDLC (High-level Data Link Control) device having four ports corresponding to a level 2 is initialized.
Figure 8:
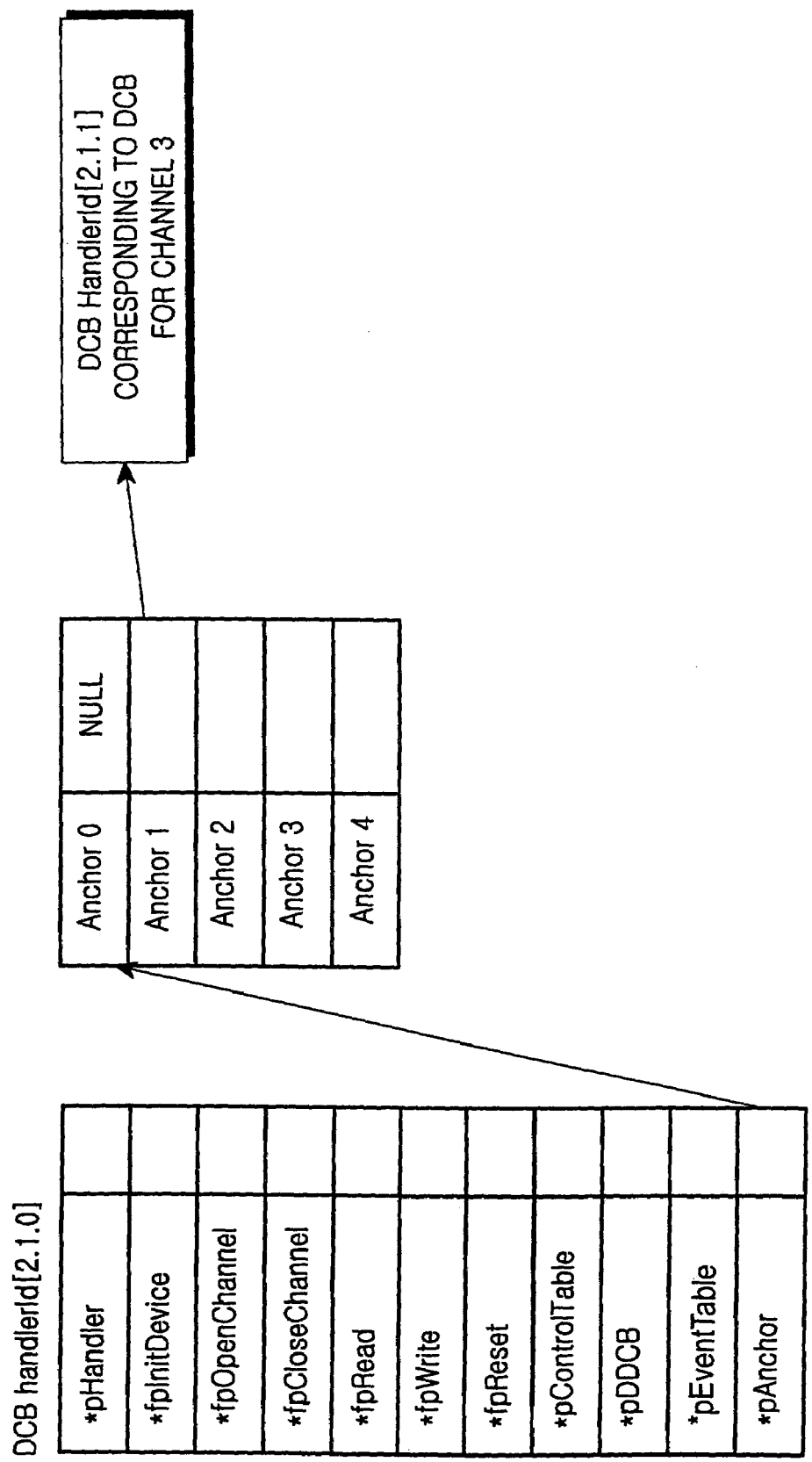
FIG. 8 is a view illustrating a connection structure of a DCB when a channel is initialized.

FIG. 5 is a view illustrating a connection structure of a DCB (Device Control Block) after an application user calls an API "Dia_InitDevice" of the DIA hierarchy 22 for the sake of the device initialization. FIG. 6 is a view illustrating a final DCB in a level 1 initialization stage. FIG. 7 is a view illustrating a connection structure of a DCB when an HDLC (High-level Data Link Control) device having four ports corresponding to a level 2 is initialized. FIG. 8 is a view illustrating a connection structure of a DCB when a channel is initialized.

First, the device handler IDs will be described in detail.

A device handler ID of a corresponding device generated by the DIA hierarchy 22 is represented, for example, as a "DCB handlerId[1.0.0]" shown in FIG. 5. The device handler ID is made up of three unsigned integers associated with a level 1, a level 2 and a channel, and has a unique value within the system. The device handler ID is made up of x1.x2.x3 where x1, x2 or x3 is an unsigned integer. The device handler ID is represented as "DCB handlerId[x1.x2.x3]". Here, x1 is a value of the level 1 meaning a device ID, and x2 is a value of the level 2 meaning a logical or physical group number of a corresponding device, and x3 is a value of the channel meaning a channel number of a corresponding device or group. If values of x1, x2 and x3 are "0", it means that there is no corresponding level or channel. When the device is initialized, an integer value of x1 sequentially increases from "1" as shown in FIGS. 6 to 8. There cannot exist a handler having a value of the level 1, i.e., x1="0". This means that the value of the level 1 is not initialized.

As shown in FIG. 5, if the value of the level 1 is initialized, a DCB 32 containing elements called by a device is dynamically assigned on the basis of the standardized rule in accordance with the embodiment of the present invention. The elements include various pointers and function pointers for performing the standardized rule in the DIA hierarchy 22. When the value of the level 1 is initialized, the elements of the DCB 32 include "*pHandler", "*fpInitDevice", "*fpOpenChannel", "*fpCloseChannel", "*fpRead", "*fpWrite", "*fpReset", "*pControlTable", "*pDDCB", "*pEventTable" and "*pAnchor". The "*pHandler" is a pointer for pointing a position of a given initialization profile when a device is initialized, and the "*fpInitDevice" is a function pointer used when a device is initialized. The "*fpOpenChannel" is a function pointer used when a channel is open. The "*fpCloseChannel" is a function pointer used when a channel is closed. The "*fpRead" is a function pointer used when data of an open channel is read. The "*fpWrite" is a function pointer used when data of the open channel is written. The "*fpReset" is a function pointer used when a device is reset. The "*pControlTable" is a pointer for pointing a position of a command control table. The "*pDDCB" is a pointer for pointing a position of a device driver control table 36. The "*pEventTable" is a pointer for pointing a position of an event table 38. The "*pAnchor" is a pointer for pointing a next level.

After all devices are initialized, the DIA hierarchy 22 provides generated device handler IDs to the higher-order application 20. The higher-order application 20 initializes a corresponding device and then stores only a given device handler ID. If a device handler is called, the DIA hierarchy 22 receives the device handler ID, decides whether some device driver must be called, and calls a device driver according to the decision.

Next, a standardized command control table being a function table will be described.

The standardized command control table employs function blocks and elements associated with a corresponding function block defined by international organizations for standardization such as ITU, IETE, ETSI, ATM forum, ADSL forum, etc. If there is an additional requirement, it can be optionally added to the standardized command control table. For example, the present inventor organized information relating to super high-speed communications as tables. The made tables are stored in a corresponding memory portion. Further, if necessary, another function can be optionally added.

As shown in FIG. 5, the standardized command control table 34 is positioned in a memory portion pointed by the pointer of "*pControlTable" of a corresponding DCB. A command ID of the command control table 34 is standardized and defined as a unique value. The command ID is mapped to the function pointer of "*fpCommandFn" corresponding to a command function.

A structure of the command control table 34 according to the embodiment of the present invention is as follows.

<<Structure of Standardized Command Control Table>>

```
typedef enum
{
    D_SDH_COMMAND_ID_START = 0x2000000
    D_SDH_SPI_COMMAND_ID_START = 0x2000100
    D_SDH_SPI_SET_ALS,
    D_SDH_SPI_GET_ALS,
    ....
    D_SDH_COMMAND_ID_END
} DIA_COMMAND_ID_SDH_E;
```

In the above-described structure of the standardized command control table 34, a standardized command "typedef enum" such as "DIA_COMMAND_ID_SDH_E" exists as "DIA_COMMAND_ID_PDH_E", "DIA_COMMAND_ID_ATM_E", etc. on a field basis. Various command functions can be arbitrarily added to the standardized command control table 34. The user of the higher-order application can arbitrarily call a corresponding device driver through the standardized command control table 34. Although a device driver is changed, a corresponding standardized command remains as it is. Only a function pointer is varied when the corresponding device driver carries out a corresponding command. The function pointer is provided to the DIA hierarchy 22 by the device driver when a device is initialized. The command is called through an API "Dia_Control" by the user of the higher-order application. When the user of the higher-order application calls a specific control command through the API "Dia_Control", only a device driver positioned below the DIA hierarchy 22 is varied.

Next, the device driver control table 36 according to the embodiment of the present invention will be described with reference to FIG. 5. In FIG. 5, the device driver control table 36 is a table pointed by the pointer of "*pDDCB". The device driver control table 36 contains function pointers "*fp" for pointing positions of "InitLevel1", "InitLevel2", "Open-Channel", "CloseChannel", a control table, an event table", etc., e.g., "*fpInitLevel1", "*fpInitLevel2", "*fpOpenChannel", "*fpCloseChannel", "*fpControlTable (not shown)", "*fpEventTable (not shown)", etc. Further, the device driver control table 36 contains information (not shown) indicating the number of initialization functions, the number of ports and the number of channels associated with a device. The device driver control table 36 is defined to commonize controls of the device drivers and corresponds to a DDCB (Device Driver Control Block) for providing information associated with the existence of a corresponding function and the position of a corresponding function. The device driver control table 36 contains "*fpInitLevel1", "*fpInitLevel2", "*fpOpenChannel", "*fpCloseChannel", "*fpControlTable (not shown)", "*fpEventTable (not shown)", etc. When a device is initialized, the device driver control table 36 being the DDCB is located by the pointer of "*pDDCB". The materials of "*fpInitLevel1", "*fpInitLevel2", "*fpOpenChannel", "*fpCloseChannel", "*fpControlTable (not shown)", "*fpEventTable (not shown)", etc. are filled as information of the assigned DCB 32.

Next, an event table associated with the embodiment of the present invention will be described.

Figure 9:
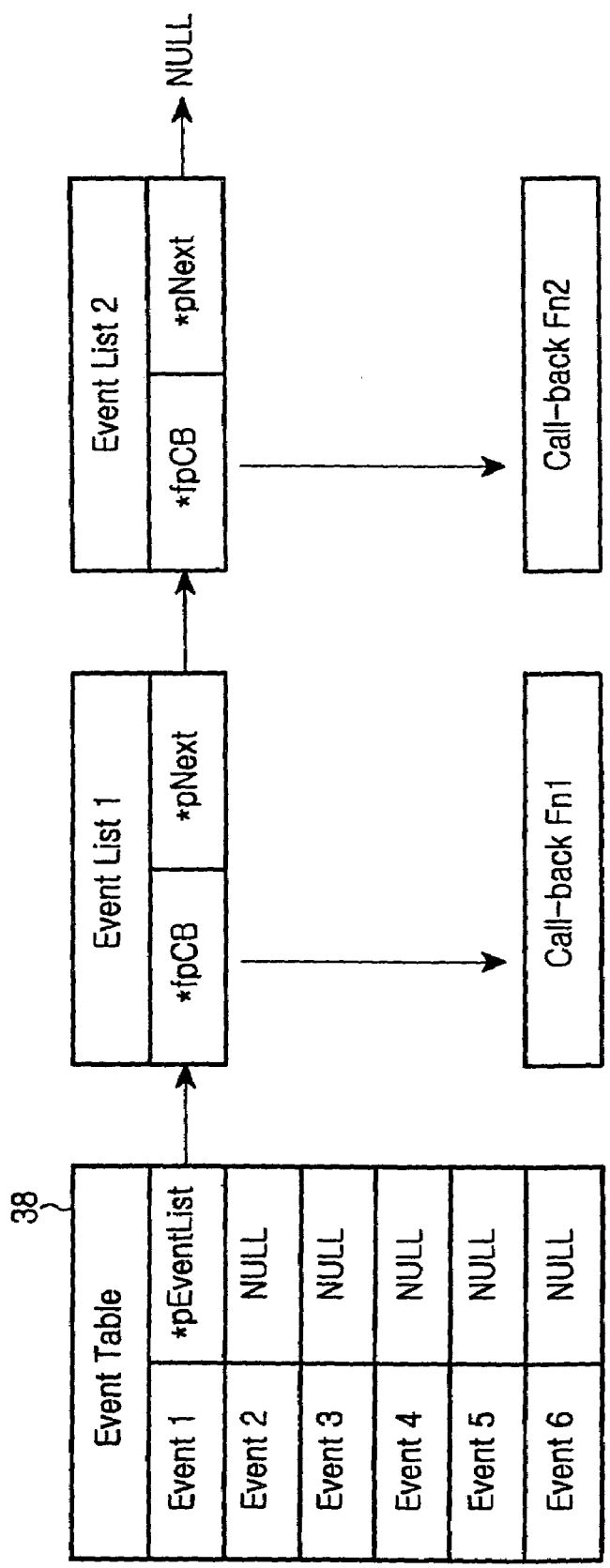
FIG. 9 is a view illustrating a structure of an event table.

An event table 38 shown in FIG. 5 is a structure located at a position pointed by the pointer of "*pEventTable" of a corresponding DCB being generated only if necessary. When the event table is not used, it is indicated as a null. The event table 38 includes an event ID of "EventId" and an event list structure pointer of "*pEventList". Each event list is a linked list as shown in FIG. 9. Accordingly, a plurality of places can be notified of one event and a call-back function of "Call-back Fn" can be called. The event table 38 initially includes the event ID of "EventId" and the pointer of "*pEventList" is initially pointed as a null. When the user of the higher-order application 20 uses a certain event, the user of the higher-order application 20 is able to regisister and use the event by connecting to "*EventList", a pointer of an event list structure using an API "Dia_Register".

A structure of the event table 38 according to the embodiment of the present invention is as follows.

<<Structure of Event Table>>

```
typedef struct
{
    EXECFUNC pCallBackFunc;
    EXACTLY_INT32_T *pNextCallback;
} DIA_EVENT_CONFIG_T;
typedef struct
{
    EXACTLY_UNIT32_T eventId;
    DIA_EVENT_CONFIG_T *pEventList;
} DIA_EVENT_TABLE_T;
```

A profile of a device module associated with the embodiment of the present invention will be described.

An input argument needed when the function pointer of "*fpInitDevice" of a corresponding DCB 32 shown in FIG. 5 is carried out has a form of a structure pointer. In a special case, a structure of a corresponding device can be defined. However, in a conventional case, a common structure including a base address at the time of initializing a value of the level 1, a group ID corresponding to the level 2 and a channel ID at the time of initializing a channel is used.

A common structure of a profile of a device module according to the embodiment of the present invention is as follows.

<<Common Structure of Profile of Device Module>>

```
typedef struct
{
    EXACTLY_UNIT32_T baseAddress1;
    EXACTLY_UNIT32_T numExtraBaseAddresses;
    EXACTLY_UNIT32_T *pExtraBaseAddresses;
} DIA_BASE_ADDR_T;
typedef struct
{
    DIA_BASE_ADDR_T baseAddress;
    EXACTLY_UNIT_32_T *pUserDefine;
} DIA_COMMON_LEVEL1_PROFILE_T;
typedef struct
{
    EXACTLY_INT32_T groupNo;
    EXACTLY_UNIT32_T *pUserDefine;
} DIA_COMMON_LEVEL2_PROFILE_T;
typedef struct
{
    EXACTLY_INT32_T channelNo;
    EXACTLY_UNIT32_T *pUserDefine;
} DIA_COMMON_CHANNEL_PROFILE_T;
```

Hereinafter, a detailed description of an operation according to the embodiment of the present invention is as follows.

When the higher-order application 20 calls a function of a function block to be used, the DIA hierarchy 22 identifies the existence of a corresponding function from a function table using the DDCB having information indicating the existence and positions of corresponding function tables. If the corresponding function tables exist, the corresponding function is called. To call the function, the DIA hierarchy 22 informs the higher-order application 20 of a device handler ID when a corresponding device is initialized and then the higher-order application 20 accesses a lower-order device driver using the device handler ID.

First, an operation at the time of initializing a device is as follows.

When the user of the higher-order application 20 calls an API "Dia_InitDevice", the DIA hierarchy 22 dynamically assigns the DCB 32 containing pointers associated with each of function blocks (e.g., a control table, an event table, etc.) used by the higher-order application 20 through the DDCB having information indicating corresponding function tables.

After the API "Dia_InitDevice" is called, a connection of the DCB will be described in detail with reference to FIGS. 5 to 8. According to a basic flow form, an addition of a database structure will be described.

(1) Level 1 Initialization

A device to be initialized has a level 1, a level 2 and a channel. When the level 1 is initialized, the DCB 32 being a highest-order block of the device is dynamically assigned. Thereafter, the level 2 of the device is pointed by an anchor pointer of "*pAnchor" of the DCB 32 associated with the level 1. Since the number of devices used in each card is a known value, it is assumed that a highest-order database 40 is defined with a pointer of "*DCB" indicating a device ID shown in FIG. 5 as a global variable and the DCB 32.

A form when the level 1 is initialized is the same as FIG. 5. Further, in a level 1 initialization stage, a final DCB is shown in FIG. 6. Whenever the DCB 32 shown in FIG. 5 is generated, the DIA hierarchy 22 returns a unique device handler ID value of "DCB HandlerId[x1.x2.x3]" corresponding to each DCB 32 to the higher-order application 20 as shown in FIG. 6. That is, the DIA hierarchy 22 gives the device handler ID value of "DCB HandlerId[x1.x2.x3]" while sequentially increasing a value of x1 from "1" according to an initialization sequence of the level 1 of a device. Referring to FIG. 6, a device handler ID value of an HDLC (High level Data Link Control) returns to "DCB HandlerId[1.0.0]". A device handler ID value of a LAN (Local Area Network) returns to "DCB HandlerId[3.0.0]". A device handler ID value of a UTOPIA (Universal Test & Operations Physical layer Interface for ATM) returns to "DCB HandlerId[4.0.0]".

The higher-order application 20 should manage the returned device handler ID value of "DCB HandlerId [x1.x2.x3]". The user of the higher-order application 20 can call a corresponding function using the returned device handler ID value of "DCB HandlerId[x1.x2.x3]". Further, since the device handler ID corresponding to a device is given on the basis of the device initialization sequence, the user of the higher-order application 20 should identify any device corresponding to the returned device handler ID. For example, when there are three HDLC1, HDLC2 and HDLC3 devices, the x1 value of the HDLC3 device becomes "1" when the HDLC3 device is initialized.

(2) Level 2 Initialization

The DIA hierarchy 22 can carry out the level 2 initialization after the level 1 initialization. At this time, used information includes information of the allowable number (the number of ports) in the level 2 associated with the DDCB (having a unique initialization function, and information relating to the number of ports or channels). For example, an anchor is assigned so that the level 2 initialization can be carried out by referring to the number of ports associated with a corresponding device. Further, the DIA hierarchy 22 designates an address of the DCB 32 generated at an anchor of the level 1 so that the DCB 32 necessary for the level 2 can be referred to.

FIG. 7 is a view illustrating a connection structure of a DCB when an HDLC device having four ports corresponding to a level 2 is initialized. Referring to FIG. 7, anchors of "Anchor1", "Anchor2", "Anchor3" and "Anchor4" assigned to the four ports corresponds to device handler ID values of "DCB HandlerId[1.1.0]", "DCB HandlerId[1.2.0]", "DCB HandlerId[1.3.0]" and "DCB HandlerId[1.4.0]", respectively. For example, if there are the four ports of "port1", "port2", "port3" and "port4", the anchors of "Anchor1", "Anchor2", "Anchor3" and "Anchor4" are assigned to the four ports of "port1", "port2", "port3" and "port4", respectively. The device handler ID values of "DCB HandlerId [1.1.0]", "DCB HandlerId[1.2.0]", "DCB HandlerId[1.3.0]" and "DCB HandlerId[1.4.0]" can be given to the four ports of "port1", "port2", "port3" and "port4", respectively.

(3) Channel Initialization

A DCB associated with a channel is generated only if necessary. Where the DCB is associated with only a channel irrespective of the level 2, an anchor of "Anchor 0" is connected to the DCB as shown in FIG. 8.

In a connection structure for channel initialization as shown in FIG. 8 similar to FIG. 7, anchors identical with the number of channels are assigned and each anchor is connected to the DCB. At this time, a device handler ID value is returned. A port corresponding to the anchor of "Anchor 1" is associated with four channels of "channel 1", 'channel 2", "channel 3" and "channel 4". When the channel of "channel 3" is open, "DCB HandlerId[2.1.1]" for the open channel o "channel 3" is returned according to an initialization sequence. The user of the higher-order application 20 should manage a corresponding channel and a device handler ID value mapped to the channel according to the device initialization sequence.

After the device initialization, the higher-order application 20 calls a function of a function block using a device handler ID value of "DCB HandlerId[x1.x2.x3] being a standardized identifier. Accordingly, the DIA hierarchy 22 identifies the existence of a corresponding function from a function table of a corresponding device driver using a DDCB having information indicating positions of corresponding function tables. If a corresponding function exists, the function is called.

Figure 10:
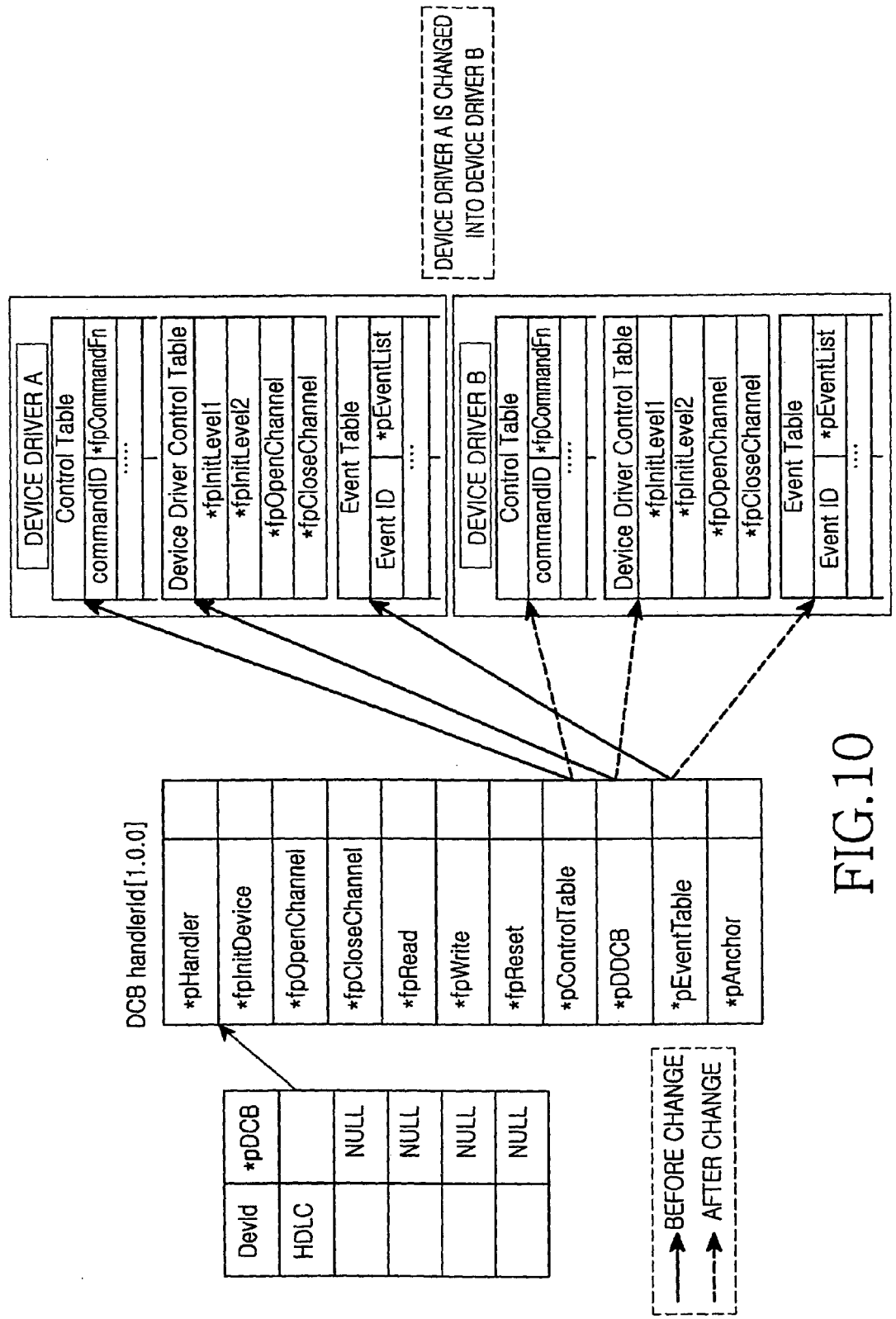
FIG. 10 is a view illustrating a case where a device driver is changed (or replaced) in accordance with an embodiment of the present invention.

FIG. 10 is a view illustrating a case where a device driver is changed (or replaced) in accordance with an embodiment of the present invention.

Referring to FIG. 10, although a device driver A is changed to a device driver B by the DIA hierarchy 22, a device handler ID value of "DCB handlerId[1.0.0] for a device HDLC is never varied. What is varied is that only a lower-order device driver and pointers (addresses) of the DCB 32 point new devices under control of the DIA hierarchy 22. Accordingly, the higher-order application 20 can carry out the same functions although the lower-order device driver A is changed to the lower-order device driver B.

FIGS. 11 to 14 are views illustrating a comparison of operations in a conventional art and an embodiment of the present invention where a higher-order application or a lower-order device is changed.

Figure 11:
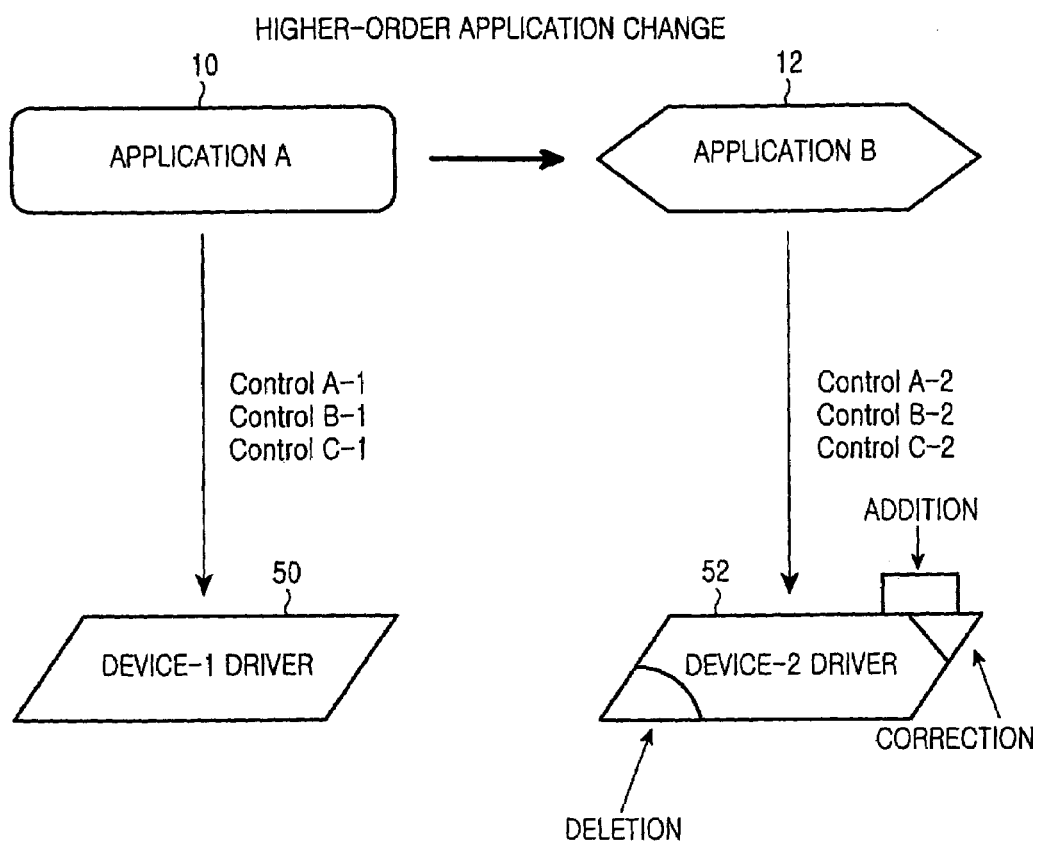
FIG. 11 is a view illustrating a case where a higher-order application (program) is changed in a conventional art.
Figure 13:
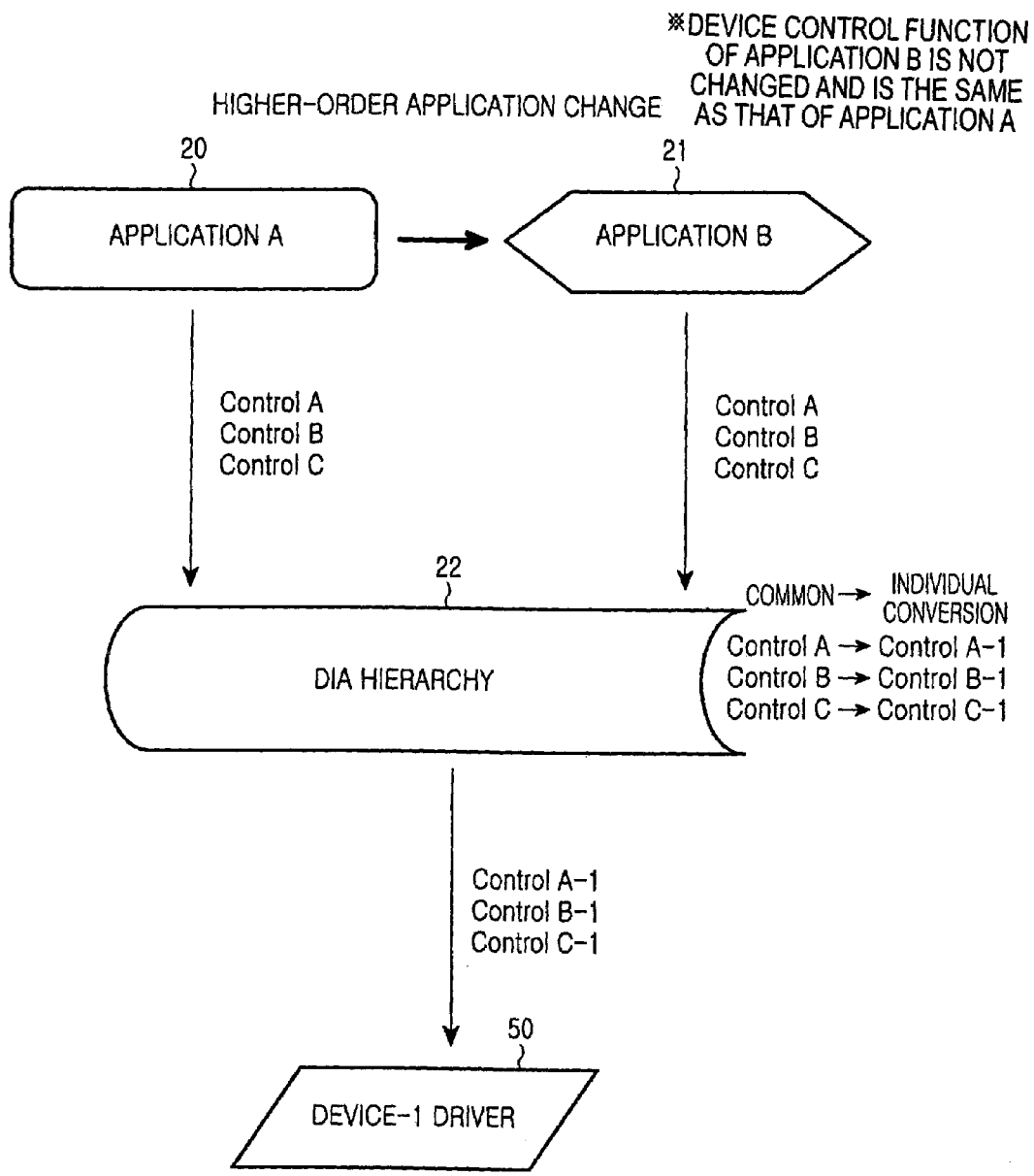
FIG. 13 is a view illustrating a case where a higher-order application (program) is changed in accordance with an embodiment of the present invention.

FIGS. 11 and 13 is views illustrating cases where a higher-order application is changed. FIG. 11 is a view illustrating a case where a higher-order application (program) is changed in a conventional art. FIG. 13 is a view illustrating a case where a higher-order application (program) is changed in accordance with an embodiment of the present invention.

First, referring to FIG. 11, when the higher-order application A is changed to the higher-order application B in the conventional art, the higher-order application should be not only changed but also the lower-order device driver should be changed. The reason why the higher-order application and the lower-order device order should be changed is that structures and APIs associated with the higher-order applications A and B are different and then the lower-order device driver should provide changed forms of APIs that are requested. Accordingly, an operation of an addition, deletion or correction should be applied to a pre-existing lower-order device driver. Changed portions should be newly verified. Of course, the higher-order application B should be newly verified.

In order to make up for a disadvantage of the conventional art shown in FIG. 11, the DIA hierarchy 22 is arranged between a higher-order application hierarchy and a lower-order device driver hierarchy as shown in FIG. 13 in accordance with the embodiment of the present invention. If the DIA hierarchy 22 is arranged between the higher-order application hierarchy and the lower-order device driver hierarchy, the higher-order applications A and B can use the same control command of Control A, Control B and Control C based on a DIA's standardized rule, although the higher-order applications A and B are changed. The higher-order application does not directly control the device driver, but indirectly controls the device driver through the DIA hierarchy 22 using the control commands, which are included in devices. Referring to FIG. 13, the control commands of Control A, Control B and Control C based on a standardized common format used by the higher-order applications A and B are individually converted into other control commands of Control A-1, Control B-1 and Control C-1 used in a device 1 by the DIA hierarchy 22. The control commands of Control A-1, Control B-1 and Control C-1 are provided to a device-1 driver. Therefore, the higher-order application is not especially dependant upon the lower-order device driver, although it is changed.

Figure 12:
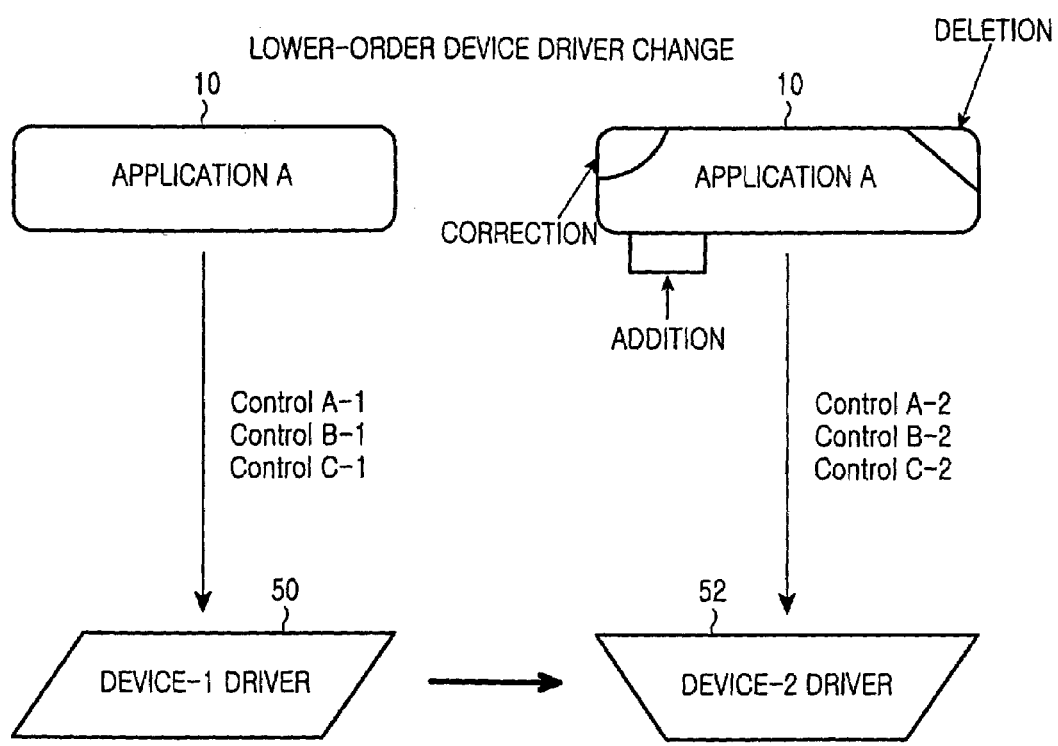
FIG. 12 is a view illustrating a case where a lower-order device is changed in a conventional art.
Figure 14:
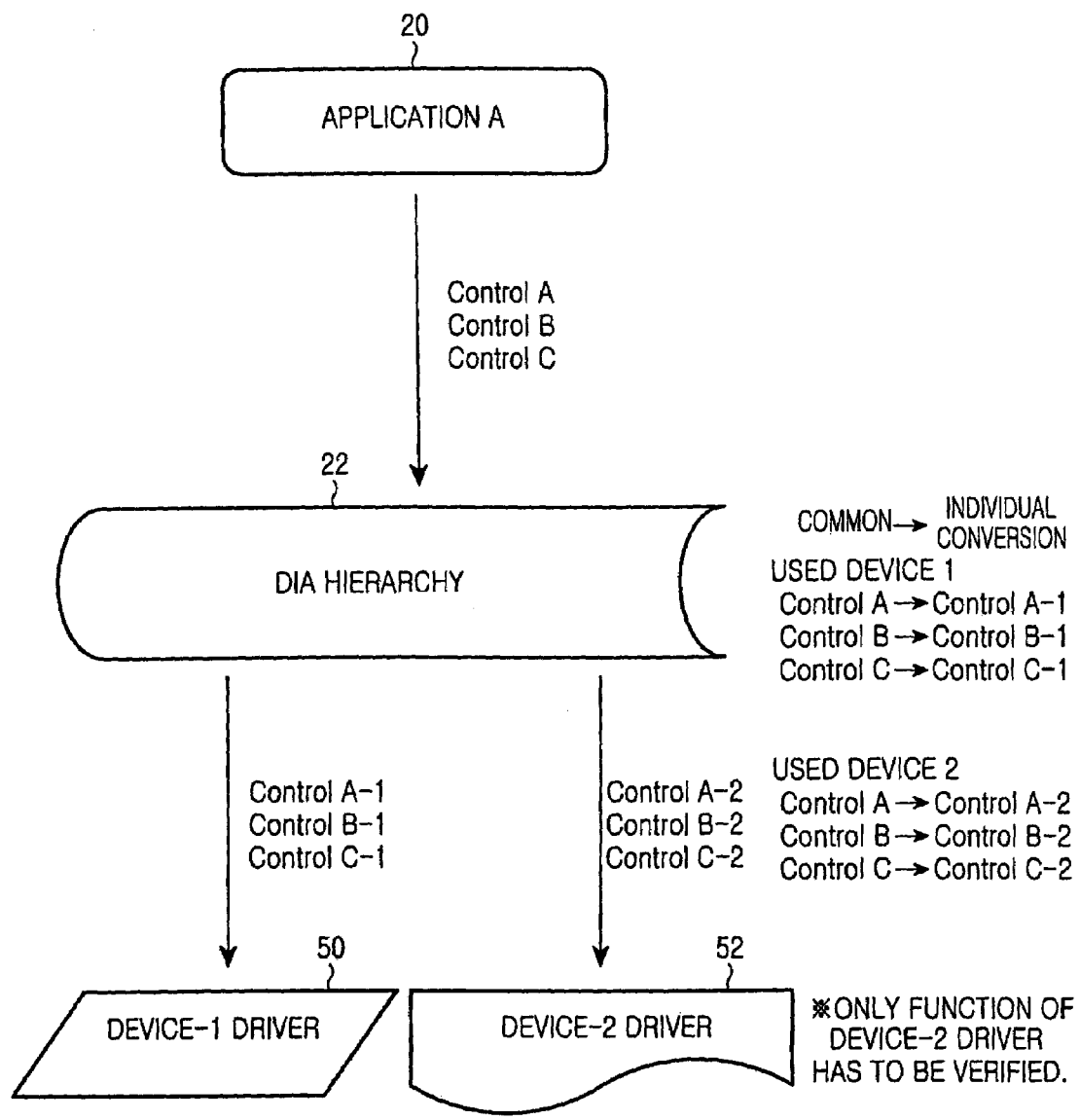
FIG. 14 is a view illustrating a case where a lower-order device is changed in accordance with an embodiment of the present invention.

FIGS. 12 and 14 are views illustrating a case where a higher-order application is not changed, but a lower-order device is changed. FIG. 12 is a view illustrating a case where a lower-order device is changed in a conventional art. FIG. 14 is a view illustrating a case where a lower-order device is changed in accordance with an embodiment of the present invention.

First, referring to FIG. 12, where a higher-order application is not changed, but a lower-order device is changed in the conventional art, an API of the lower-order device driver is changed. Similarly, to use the changed API of the lower-order device driver, the higher-order application is changed. That is, a part of the higher-order application should be deleted or corrected or another part should be added to it. If so, the higher-order application as well as the changed lower-order device driver should be re-verified.

On the other hand, if the DIA hierarchy 22 is arranged between the higher-order application hierarchy and the lower-order device driver hierarchy as shown in FIG. 14 in accordance with the embodiment of the present invention, the higher-order application has not to be changed and only the lower-order device driver is changed on the basis of the DIA hierarchy 22. Accordingly, only the verification of the lower-order device driver is needed. Referring to FIG. 14, the control commands of Control A, Control B and Control C based on a standardized common format used by the higher-order application A are individually converted into other control commands of Control A-1, Control B-1 and Control C-1 included in a device 1 by the DIA hierarchy 22. The control commands of Control A-1, Control B-1 and Control C-1 are provided to a device-1 driver. However, if the lower-order device driver is changed from a device-1 driver to a device-2 driver, the device-2 driver informs the DIA hierarchy 22 that control commands used in a device 2 are Control A-2, Control B-2 and Control C-2. Thereafter, the DIA hierarchy 22 individually converts the control commands of Control A, Control B and Control C based on the standardized common format used by the higher-order application A into other control commands of Control A-2, Control B-2 and Control C-2 used in a device 2.

The present invention prevents a higher-order application hierarchy and a lower-order device driver hierarchy from directly accessing each other by arranging a DIA (Device Independent Access) hierarchy between the higher-order application hierarchy and the lower-order device driver hierarchy in a communication system. Accordingly, the higher-order application hierarchy and the lower-order device driver hierarchy can access the lower-order device driver hierarchy and the higher-order application hierarchy via the DIA on the basis of the DIA's standardized rule, respectively. Because the higher-order application hierarchy and the lower-order device driver hierarchy accesses the lower-order device driver hierarchy and the higher-order application hierarchy on the basis of the DIA's standardized rule, respectively, a period of time required for the development of products, and costs of product development can be reduced, and efficiency of product development can be improved.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims, which follow along with their full scope of equivalents.

What is claimed is:

1. A method for commonly controlling device drivers, comprising the steps of:

arranging a device independent access hierarchy between an application hierarchy and a device driver hierarchy;

defining functions available in a corresponding device driver among functions of a function block in a function table;

when a device is initialized, allowing said device independent access hierarchy to generate a device handler identifier having a standardized common data format for said device and transmit the generated device handler identifier having the standardized common data format to the application hierarchy of a higher order, with said device handler identifier being represented as DCB handlerId, where x1, x2 or x3 is an unsigned integer, x1 being a value of the level 1 meaning a device ID, x2 being a value of the level 2 meaning a logical or physical group number of a corresponding device, x3 being a value of a channel meaning a channel number of a corresponding device or group; and allowing the higher-order application hierarchy to call a predetermined device using the device handler identifier having the standardized common data format, and allowing said device independent access hierarchy to identify a function of the corresponding device driver from the function table using the device handler identifier having the standardized common data format and call the function of the corresponding device driver.

2. The method as set forth in claim 1, with values of x1, x2 and x3 being "0" corresponding to there being no corresponding level or channel and the value of x1 sequentially increasing from "1" when the device is initialized.

3. A method for commonly controlling device drivers, comprising the steps of:

arranging a device independent access hierarchy between an application hierarchy and a device driver hierarchy;

when a device initialization is controlled by said application hierarchy, allowing said device independent access hierarchy to carry out level 1 initialization, level 2 initialization and channel initialization and generate a device handler identifier having a standardized data format for devices;

allowing said device independent access hierarchy to dynamically assign a device control block, containing elements for carrying out a standardized rule, corresponding to said device handler identifier having the standardized data format;

allowing said device independent access hierarchy to provide said device handler identifier to said application hierarchy; and allowing said application hierarchy to call a predetermined device through said device independent access hierarchy using said device handler identifier.

4. The method as set forth in claim 3, with the elements of said device control block comprising a pointer of "*pControlTable" for pointing a position of a command control table, the command control table containing a command identifier having a standardized unique value and a command function pointer mapped to the command identifier, a pointer of "*pDDCB" for pointing a position of a device driver control table through which the existence and position of a corresponding function is identified, and a pointer "*pAnchor" for pointing a next level.

5. The method as set forth in claim 3, with the elements of said device control block comprising a pointer of "*pHandler" for pointing a position of a given initialization profile when a device is initialized, a function pointer of "*fpInitDevice" being used when a device is initialized, a function pointer of "*fpOpenChannel" being used when a channel is open, a function pointer of "*fpCloseChannel" being used when a channel is closed, a function pointer of "*fpRead" being used when data of an open channel is read, a function pointer of "*fpWrite" being used when data of the open channel is written, a function pointer of "*fpReset" being used when a device is reset, a pointer of "*pControlTable" for pointing a position of a command control table containing a command identifier having a standardized unique value and a command function pointer mapped to the command identifier, a pointer of "*pDDCB" for pointing a position of a device driver control table through which the existence and position of a corresponding function is identified, a pointer of "*pEventTable" for pointing a position of an event table, and a pointer "*pAnchor" for pointing a next level.

6. The method as set forth in claim 3, with the level 1 initialization of said device being made by giving a device identifier value of x1 as a unique value for each device based on a sequence of the level 1 initialization in the device handler identifier represented as DCB HandlerId where x1, x2 or x3 is an unsigned integer.

7. The method as set forth in claim 6, with the level 2 initialization of the device being made by referring to the number of logical or physical groups, assigning anchors, and giving a group value of x2 as a unique value for each anchor in the device handler identifier represented as DCB HandlerId where x1, x2 or x3 is an unsigned integer.

8. The method as set forth in claim 7, with the level 3 initialization of the device being made by giving a channel value of x3 for each of channels belonging to the device and groups within the device on the basis of an open channel sequence in the device handler identifier represented as DCB HandlerId where x1, x2 or x3 is an unsigned integer.

* * * * *